3,512,710
THERMOSTATIC VALVE WITH EXCHANGEABLE
HEAT SENSITIVE ELEMENT
Dario Resta, Turin, Italy, assignor to Triberti Francesco
di Triberti Giovanni, Turin, Italy, an Italian company
Filed Oct. 18, 1967, Ser. No. 676,189
Int. Cl. F01p 7/16
U.S. Cl. 236—34                                  1 Claim

ABSTRACT OF THE DISCLOSURE

A thermostatic valve is provided for use in controlling the cooling fluid, preferably for internal combustion engines, comprising a housing and a thermostatic element which is temperature-responsive for controlling the movement of a valve relative to its seat, against spring forces.

---

In accordance with this invention, a thermostatic valve is provided, having an exchangeable heat sensitive element and intended mainly for internal combustion engines to control the temperature of the cooling fluid. The heat sensitive element is made exchangeable since its service life is generally limited. The rest of the valve is formed integrally to avoid faults deriving from welding or similar joints in the known valves. The valve according to the invention substantially comprises an integrally formed hollow main body provided with a peripheral circular flange and a central opening. The peripheral wall adjacent the opening extends for a short length in the form of a truncated cone forming a seat for a poppet valve which incorporates the heat sensitive element. Adjacent the truncated cone the peripheral wall of the valve opening has a cylindrical form and carries a web bridging the valve opening. The peripheral flange of the valve has two diametrically opposed downwardly extending tongues the ends of which are bent at 90° toward the interior of the valve and carry a cross member urged against said tongue ends by a spring surrounding the valve shaft of the poppet valve and urging with its other end against the disc of the poppet valve to normally close the valve opening. A guide pin is located with one end in the center of the valve shaft and dips into the wax in the valve shaft forming the heat sensitive element. The other end of the guide pin is secured in an aperture at the end of the main body of the valve opposite the central opening therein and in its central portion the guide pin is slidably received in a guide bushing in the valve shaft at one end thereof with the interposition of elastic sealing gaskets. The cross member supported by the bent-off ends of the tongues is removable to permit exchanging of the poppet valve embodying the heat sensitive element by a simple movement as for closing a bayonet catch. To prevent slipping of the cross member relative to said bent-off ends, the cross member is provided with ribs which also serve to reinforce the structure of the cross member. In its center the cross member is provided with an aperture for the passage of the valve shaft and this aperture is surrounded by an inwardly extending wall serving for centering the spring and as a guide for the valve shaft. When the wax of the heat sensitive element expands a pressure is exerted on the walls of the heat sensitive element constituted by the poppet valve and this pressure will be directed away from said guide pin and becomes effective to move the valve relative to the main body in a direction to open the valve opening against the action of the spring since movement in the opposite direction is prevented by the engagement of the valve disc on the valve seat, the poppet valve sliding on said guide pin during the opening movement.

This invention relates to a thermostatic valve having an integral external structure and intended for controlling the temperature of a fluid used to cool an internal combustion engine, such valve being of limited dimensions, great sturdiness and affording the possibility of rapidly replacing the heat sensitive element with another one of the same type or a different type than that of the faulty one.

The known thermostatic valves are formed of several metal parts connected with one another by welding, riveting, clinching or the like. The connections produced by these methods break easily, allow the infiltration of water without providing a possibility of checking whether they are still tight, require special equipment for their mounting and, above all, when it is found that the heat sensitive element does no longer work satisfactorily, either during testing in the production works or later in use, it is necessary to replace the entire thermostat.

It is the object of the present invention to eliminate the above-mentioned disadvantages. This is achieved by providing a thermostatic valve having an exchangeable heat sensitive element and substantially comprising a main body provided with a flange and a central opening having a wall extending for a small length in the form of a truncated cone so as to form in its interior a seat for a poppet valve or heat sensitive element, and an adjacent cylindrical portion carrying a web bridging the opening, and the flange is provided with two diametrically opposed downwardly extending tongues the ends of which are bent at 90° toward the interior of the general extension of the valve, and the poppet valve forming the heat sensitive element is intended to close the aperture of the main body by means of a spring bearing against the disc of the valve and a cross member resting on the ends of the tongues, and is set in motion by the expansion of a wax sealingly enclosed in the shaft of the valve while a guide pin located in the center of the valve shaft is supported at one end of the web and sunk with the other in the wax.

A preferred embodiment of the invention will now be described by way of example and with reference to the accompanying drawing, in which.

Figure 1:
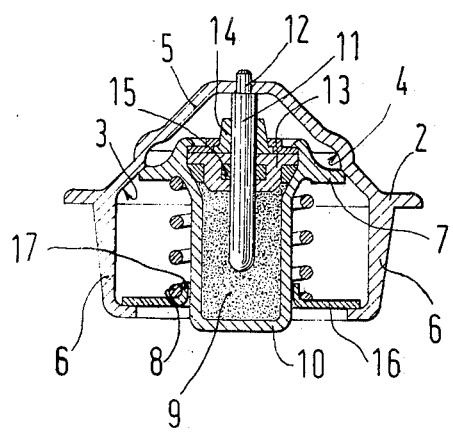
FIG. 1 is an axial section through a thermostatic valve according to the invention.
Figure 2:
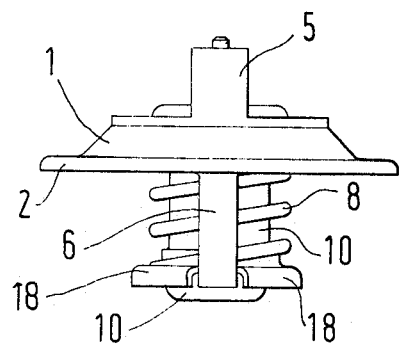
FIG. 2 is a side view of the same valve in a position rotated through 90° with respect to FIG. 1.
Figure 3:
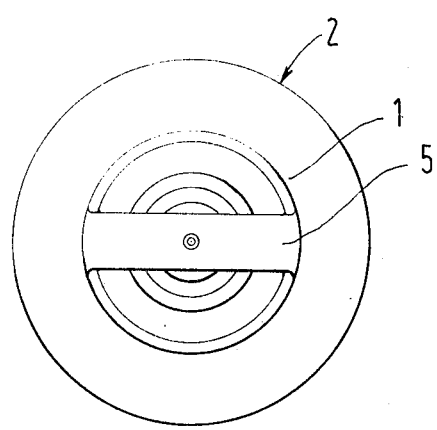
FIG. 3 is a top plan view of the valve.
Figure 4:
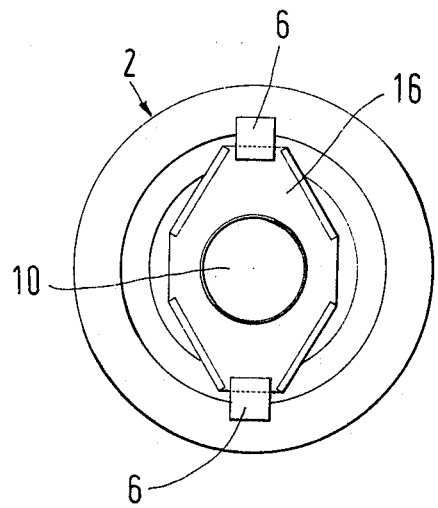
FIG. 4 is a bottom plan view thereof.

As shown in the drawing, the thermostatic valve consists of a main body 1 provided with a flange 2 and a central opening having a wall extending for a small length in the form of a truncated cone 3 adjacent a cylindrical portion 4 carrying a web 5 bridging the central opening in the main body 1. Two diametrically opposed tongues 6 extend downwardly from the flange 2 and have their lower ends bent at 90° toward the interior.

A poppet valve 7 consisting of a heat sensitive element serves to close the opening of the main body 1 under the action of a spring 8 bearing against a disc of the valve and a cross member 16 supported by the ends of the tongues 6. The poppet valve 7 is set in motion by the expansion of a special wax 9 hermetically sealed in a shaft 10 of the valve, due to the variation in temperature of the fluid to be controlled.

A pin 11 is provided for centering and guiding the movement of the valve and located in the center of the shaft 10. One end of the pin 11 bears against the web 5 at 12 while the other is sunk in the interior of the shaft 10 concentrically therewith. The pin 11 is retained in the shaft 10 by a guide bushing 13 and elastic sealing gaskets 14 and 15. The thrust on the shaft 10 is produced directly by the expansion of the wax contained therein.

Since the pin 11 bears against the web 5 and thus cannot move, the valve 7 will be forced in the opposite direction again the action of the spring 8 and open the valve aperture.

The cross member 16 supported on two bent-off ends of the tongues 6 forms a support for the spring 8 and is provided with a central cylindrical aperture having an upwardly extending wall 17 serving as guide means for the valve shaft 10 and centering means for the spring 8. The cross member 16 has its two arms 18 provided with ribs to reinforce its structure and provide a gripping surface at its ends for retaining the bent-off ends of the tongues 6 and prevent the rotation of the cross member 16 relative to such ends.

Thus, the heat sensitive element may be mounted by merely pressing against the cross member 16 and imparting it a movement as for closing a bayonet catch after the heat sensitive element and the spring 8 have been previously brought into position.

The main body 1 of the thermostatic valve is integrally formed from a plastics material by pressing or injection molding.

I claim:

1. A thermostatic valve for use in controlling the cooling fluid in internal combustion engines or the like, comprising a one-piece housing, which housing includes a ring-shaped valve seat, a frame on one side of said valve seat and a pair of diametrically opposite arms on the other side of said valve seat extending perpendicularly to the latter and having their end portions each bent at 90° towards the end portion of the other arm, said valve also comprising a separate bridge-like elongated element having a central opening and bearing with its ends on the surfaces facing said valve seat of the bent end portions of said arms, a thermostatic element arranged in said housing, said thermostatic element having a disk-like valve portion cooperating with said valve seat and being arranged on the side of the latter facing said bridge-like element, said disk-like valve portion being carried by a cylindrical container slidably mounted within the central opening of the bridge-like element and containing heat sensitive expansion materials surrounding a pin projecting outwardly from said container and having its free end arranged in a seat coaxial with said valve seat and said opening, formed at the top of said frame, a helical spring being interposed between said bridge-like element and said disk-like valve portion for constantly urging the latter in the direction of the ring-shaped valve seat, the sides of the bridge-like element being formed with ridges centering said bridge-like element with respect to said arms, wherein said elongated bridge-like element has a length greater than its width as measured across its central opening, with the width being of a dimension less than the distance between the end portions of said housing arms, and with the length being of a greater dimension than the distance between the end portions of said housing arms.

References Cited

UNITED STATES PATENTS 3,167,249    1/1965    Moosmayer    236—34
3,351,279    11/1967    Saur    236—34

EDWARD J. MICHAEL, Primary Examiner